(12) United States Patent
Sooknoi et al.

(10) Patent No.: US 8,697,777 B2
(45) Date of Patent: Apr. 15, 2014

(54) MASTERBATCH FOR PREPARING PLASTIC FILMS WITH HIGH ETHYLENE PERMSELECTIVITY AND THE PLASTIC FILMS PRODUCED THEREFROM

(75) Inventors: Tawan Sooknoi, Bangkok (TH); Chonlada Ritvirulh, Bangkok (TH); Asira Fuongfuchat, Prathumthani (TH); Doungporn Sirikittikul, Prathumthani (TH); Phatchareeya Raksa, Prathumthani (TH)

(73) Assignees: National Science & Technology Development Agency, Prathumthani (TH); King Mongkut's Institute of Technology Ladkrabang, Bangkok (TH)

( * ) Notice: Subject to any disclaimer, the term of this patent is extended or adjusted under 35 U.S.C. 154(b) by 0 days.

(21) Appl. No.: 13/813,382

(22) PCT Filed: Jul. 22, 2011

(86) PCT No.: PCT/TH2011/000028
§ 371 (c)(1),
(2), (4) Date: Jan. 30, 2013

(87) PCT Pub. No.: WO2012/026893
PCT Pub. Date: Mar. 1, 2012

(65) Prior Publication Data
US 2013/0131232 A1 May 23, 2013

(30) Foreign Application Priority Data
Aug. 4, 2010 (TH) .................... 1001001199

(51) Int. Cl.
*C08K 9/06* (2006.01)
(52) U.S. Cl.
USPC ........................... 523/212; 524/575
(58) Field of Classification Search
USPC ........................... 523/212; 524/575
See application file for complete search history.

(56) References Cited

U.S. PATENT DOCUMENTS

| | | | |
|---|---|---|---|
| 4,529,750 A * | 7/1985 | Gimpel | 523/210 |
| 4,814,364 A | 3/1989 | Yoshizaki et al. | |
| 4,840,823 A | 6/1989 | Chigami et al. | |
| 4,847,145 A | 7/1989 | Matsui | |
| 5,891,376 A | 4/1999 | Christie et al. | |
| 6,258,308 B1 * | 7/2001 | Brady et al. | 264/210.2 |
| 6,264,864 B1 * | 7/2001 | Mackay | 264/154 |
| 6,508,860 B1 | 1/2003 | Kulkarni et al. | |
| 6,706,338 B2 * | 3/2004 | Kirsch et al. | 428/1.1 |
| 6,953,510 B1 * | 10/2005 | Mackay et al. | 156/229 |

FOREIGN PATENT DOCUMENTS

| | | |
|---|---|---|
| AU | B-83930/91 | 3/1992 |
| EP | 1 170 327 | 1/2002 |
| TH | 98017 | 8/2009 |

OTHER PUBLICATIONS

International Search Report mailed Jan. 4, 2012, directed to International PCT/TH2011/000028; 2 pages.
First Examination Report dated Sep. 27, 2013, directed to NZ Application No. 606351; 2 pages.

* cited by examiner

*Primary Examiner* — Margaret Moore
(74) *Attorney, Agent, or Firm* — Morrison & Foerster LLP

(57) ABSTRACT

The invention relates to plastic compounds for preparing films in a masterbatch containing zeolite with surfaces modified by silylation reaction. The films can be obtained through thermoplastic processing by blending the masterbatch with polymers such as polyolefins and polystyrene. The masterbatch includes styrene-b-(ethylene-ran-butylene)-b-styrene copolymers with styrene to ethylene-ran-butylene content of 12:88 to 14:86, and zeolites surfaces modified by silylation reaction with organosilane compound, in 30% to 70% by weight of copolymer with zeolite. The organosilane formula is $R^1{}_n SiR^2 R_{3-n}$, where R is methoxy, ethoxy or chloro group, $R^1$ is methyl group, $R^2$ is functional group capable of a forming π-π interaction from phenyl, phenylethyl, vinyl, or propyl methacrylate groups, and n is 0 and 2. The films provide higher ethylene transmission and selectivity than films of pure polymers with unmodified zeolite, and can be used for packaging to retard ripening of fresh produce, in particular, ethylene-sensitive commodities.

8 Claims, No Drawings

US 8,697,777 B2

MASTERBATCH FOR PREPARING PLASTIC FILMS WITH HIGH ETHYLENE PERMSELECTIVITY AND THE PLASTIC FILMS PRODUCED THEREFROM

CROSS-REFERENCE TO RELATED APPLICATIONS

This application is a national stage application under 35 U.S.C. 371 of International Application No. PCT/TH2011/000028, filed Jul. 22, 2011, which claims priority of Thailand Application No. TH 20101001001199, filed Aug. 4, 2010,the contents of which prior applications are incorporated herein be reference.

TECHNICAL FIELD

The present invention generally relates to the areas of chemistry and polymer technology regarding to masterbatch for preparing plastic films with high ethylene permselectivity and the plastic films produced therefrom.

BACKGROUND OF THE INVENTION

Plastic films containing either natural or synthetic zeolites were disclosed to provide packaging materials for fresh produce. It was reported in several patents of invention that the films can keep the freshness of fresh produce packaged. Examples of the inventions are U.S. Pat. Nos. 4,814,364, 4,840,823 and 4,847,145. Furthermore, EP 1170327 A1 discloses the plastic articles, e.g., plastic films, containing organophillic zeolites dispersed in polymer matrix. Said plastic films can selectively adsorb volatile organic compounds, in particular ethylene. Nevertheless, the aforementioned inventions have disadvantages since adsorption capability of said films is limited by an amount of zeolite incorporated. Therefore, there is a disclosure of another prior invention in the publication of Thailand Patent Application No. 98017 (27 Aug. 2009) to overcome the mentioned disadvantage. The invention discloses packaging film containing 5%-30% by weight of fine zeolite particles selected from the group consisting of zeolite beta, ZSM-5 and silicalite. Said zeolite is dispersed in polymer blend in which one component is polymer having ethylene transmission rate higher than 36,000 cubic centimeters/square meters.day. Said film is obtained by conventional thermoplastic processing. Additionally, said film has ethylene transmission rate in the range of 36,000-90,000 cubic centimeters/square meters.day and can retard ripening process and extend shelf life of fruits and vegetable. However, ethylene selectivity of such films is not high enough for packing ethylene-sensitive produces. Accordingly, it is an objective of the present invention to disclose formula of masterbatch for preparing plastic films with high ethylene permselectivity, i.e., high in both permeability and selectivity, and the plastic films produced therefrom. The films from this invention have high ethylene permselectivity and are thus suitable for ethylene-sensitive commodities.

There have been several recent research studies on the development of gas separation membranes containing molecular sieve/zeolite particles uniformly dispersed in polymer matrix. It was reported that minute cracks and voids were presented at the interface of molecular sieve/zeolite particles and polymer matrix and, consequently, lessen the separation capability, in particular gas selectivity. Surface modification of zeolite particles can be carried out to improve particle dispersion and interfacial adhesion. Gas permeability and selectivity of the membranes containing such modified zeolite were, thus, enhanced. The inventions are; for example, U.S. Pat. No. 6508860 B1 discloses the gas separation membrane containing zeolites, e.g., chabazite-type zeolites, modified by monofunctional organosilane compound that can react with silanol groups on the zeolite surface. With only one reacting group per molecule, said organosilane molecules will not block the pores and channels in the zeolite structure. Said organosilane compounds were 3-aminopropyldimethyl ethoxysilane (APDMS), 3-isocyanatopropyldimethylchlorosilane (ICDMS) and 3-aminopropyldiisopropyl ethoxysilane (APDIPS). In addition, this invention points out the benefit of surface modification of zeolite that can provide good particle dispersion, leading to improve gas selectivities, especially oxygen and carbon dioxide. However, disclosed fabrication method of said membrane is the conventional method, i.e., solution casting. Said method, however, is well known to those skilled in the art that is troublesome and time-consuming.

U.S. Pat. No. 5891376 and Publication of Patent Application AU-B-83930/91 discloses an invention of controlled permeability film and process for producing said film wherein the film includes polyolefins and inert porous fillers including natural zeolite and natural zeolite of which surface is modified by silane coupling agent. Said film has reduced ratio of $CO_2$ permeability to $O_2$ permeability. Said silane coupling agents are selected from methyl-trichloro-silane and trichloro-octadecyl-silane to provide the reduced ratio of $CO_2$ permeability to $O_2$ permeability. Evidently, said coupling agents does not facilitate ethylene transports to enhance ethylene permeability which is an objective of this present invention.

This disclosed invention aims to develop plastic film having zeolite of which surface was modified by chemicals with specific functional groups to provide good particle dispersion, good particle-polymer interfacial adhesion and, thus, improved ethylene permselectivity. Accordingly, the invention discloses masterbatch for preparing the plastic films with high ethylene permselectivity and the plastic films produced therefrom.

SUMMARY OF THE INVENTION

The present invention involves with the development of masterbatch having zeolite of which surface is modified by silylation reaction for preparing plastic films with high ethylene permselectivity. This invention also discloses the formula of plastic films produced from said masterbatch and other polymer selected from polyolefins and polystyrene by conventional thermoplastic processing. Masterbatch from this invention comprises:

(A) styrene-b-(ethylene-ran-butylene)-b-styrene copolymers with styrene to ethylene-ran-butylene content of 12:88 to 14:86, and
(B) zeolites of which surface is modified by silylation reaction with organosilane compound and which is presented in an amount of 30% to 70% by weight of said copolymer combined with zeolite, wherein said organosilane compound having the chemical formula:

$R_n^1 SiR^2 R_{3-n}$ in which
R is methoxy, ethoxy or chloro group,
$R^1$ is methyl group,
$R^2$ is functional group capable of forming π-π interaction selected from the group consisting of phenyl, phenylethyl, vinyl, and propyl methacrylate groups, and
n is 0 and 2

The surface modification of zeolite is carried out by silylation reaction between reactive group of organosilane and surface silanol group of zeolite. Such reaction attaches functional group capable of forming π-π interaction onto the surface of zeolite. These groups can facilitate ethylene transports by π-π interaction, providing enhanced ethylene permselectivity of the films. Additionally, the surface modification of zeolite leads to the better particle-polymer interaction and, thus, the better particle dispersion. The plastic films produced from said masterbatch, therefore, have significantly high ethylene permselectivity, and higher ethylene permselectivity than film both without zeolite and with unmodified zeolite. Said film is suitable to use as packaging film for retarding ripening process and extending shelf life of fresh produces, especially ethylene-sensitive commodities.

DETAILED DESCRIPTION OF THE INVENTION

This invention discloses formula of zeolite/polymer mixture in the form of masterbatch for preparing plastic film having high ethylene permselectivity. Said masterbatch comprises zeolite of which surface was modified by organosilane with specific functional group detailed thereafter. This invention also discloses formula of plastic packaging film produced from said masterbatch and other polymers selected from polyolefins and polystyrene.

A masterbatch for preparing plastic film comprises:
(A) styrene-b-(ethylene-ran-butylene)-b-styrene copolymers with styrene to ethylene-ran-butylene content of 12:88 to 14:86, and
(B) zeolites of which surface is modified by silylation reaction with organosilane compound and which is presented in an amount of 30% to 70% by weight of said copolymer combined with zeolite, wherein said organosilane compound having the chemical formula:

$$R_n^1 SiR^2 R_{3-n}$$

in which
R is methoxy, ethoxy or chloro group,
$R^1$ is methyl group,
$R^2$ is functional group capable of forming π-π interaction selected from the group consisting of phenyl, phenylethyl, vinyl, and propyl methacrylate groups, and
n is 0 and 2

Zeolites in this invention are zeolite with BEA framework, i.e., zeolite beta; zeolite with MFI framework, e.g., ZSM-5 and silicalite; and zeolite CaA with LTA framework. Said zeolites are suitable for adsorbing ethylene gas as their structural pores and channels are comparatively larger than kinetic diameter of ethylene molecule, ca. 0.39 nanometers. Said zeolites must selected from those having ethylene adsorbing capacity higher than 60 milliliters/1 gram of zeolite, and average particle size ($D_{50}$) of 0.25-1 micrometers. An amount of zeolite of which surface modified by silylation reaction of said organosilane in said masterbatch is in the range of 30%-70% by total solid weight.

The surface modification by silylation reaction according to this invention undergoes by reaction of surface silanol group of zeolite and alkoxy, i.e., methoxy, ethoxy or chloro, functional groups of organosilane. Such reaction is well known to those skilled in the art that can modify surface of particles having surface-hydroxyl groups. Nevertheless, said organosilane should be selected from those having monofunctional or trifunctional reacting groups. Note that organosilicone compounds, including said organosilanes, are typically water sensitive, thus the silylation reaction disclosed in this invention provides a good yield if the reaction is performed in anhydrous condition, e.g., using highly dehydrated solvents. Solvent using in this invention is selected from toluene, hexane and chloroform, preferably toluene. Composition of zeolite in the silylation reaction of this invention is 5%-30% by weight of zeolite by solvent volume and concentration of said organosilane is 0.1-10 millimoles/1 gram of zeolite, preferably 0.5-5 millimoles/1 gram of zeolite. Catalyst, i.e., triethylamine, with ratio to mole of organosilane of 0.1-1, preferably 0.5-1, should be added in the reaction. The reaction must be performed at constant temperature ranging of room temperature to 120 degree Celsius, preferably 80-120 degree Celsius, for 6-24 hours, preferably 6-12 hours.

Polymer which is selected as a matrix of the zeolite in said masterbatch is styrene-b-(ethylene-ran-butylene)-b-styrene block copolymer having styrene to ethylene-ran-butylene content of 12:88 to 14:86. The selected copolymer has very high ethylene permeability, ca. 150,000 cubic centimeters/square meters.day and can be mixed and fabricated using general procedure for production of the film articles.

The zeolite/polymer mixture in the form of masterbatch in this invention can be prepared by firstly mechanical mixing of dry components and then mixing in the molten state using the methods that is well known to those skilled in the art, for examples, internal mixer and twin screw extruder. Thereafter, the mixture should be crushed or cut into small pallet in 2.5×4 millimeter size. The obtained materbatch consists of the zeolite of which surface is modified by the aforementioned silylation reaction in an amount of 30%-70% by total weight.

Said masterbatch is used for preparing plastic film by compounding with the second polymer selected from polyolefins and polystyrene. Said polyolefins is selected from the group of polyethylene and polypropylene. An amount of said masterbatch mixed with said second polymer disclosed in this invention is in the range of 3.5%-90% of total weight. Optionally, additives, e.g., anti-blocking agent and anti-fogging agent, may be added in an amount of 0.02%-5% of total weight.

Plastic film can be prepared from said materbatch and said second polymer by firstly mechanical mixing of dry components and then mixing and fabrication in the molten state using the method that is well known to those skilled in the art, for examples, compression molding, cast film extrusion and blown film extrusion. The obtained plastic film has a thickness of 30-50 micrometers.

The plastic film disclosed in this invention contains uniformly dispersed zeolite of which surface was modified by said silylation reaction, and have very high ethylene selectivity (ethylene to oxygen permeability is 6.5-8.3 depending on polymer used), and, moreover, higher ethylene selectivity than film both without zeolite and with unmodified zeolite about 20%-70%. In addition, ethylene transmission rate of the disclosed invention is higher than those films by 8%-60%. While, oxygen transmission rate and carbon dioxide transmission rate of said film is in the range of 6,000-20,000 cubic centimeters/square meters.day and 18,000-90,000 cubic centimeters/square meters.day, respectively, which is suitable in an application of fresh produce packaging. Moreover, the film disclosed in this invention can be used in any industrial applications due to its good mechanical property and thermal sealability. Additionally, said film can be used as layer(s) on other films or porous sheets, e.g., paper and board, non-woven sheets and micro-porous sheet.

The preparation procedure of masterbatch and plastic film described in following examples.

EXAMPLE 1

Masterbatch of the phenyl modified zeolite in styrene-b-(ethylene-ran-butylene)-b-styrene copolymers with styrene content of 13% can be prepared in the following steps. Zeolite modification was carried out as follows: zeolite was dried at 100 degree Celsius under vacuum for 8 hours and then cooled to ambient temperature under vacuum. After that the solvent, toluene, was added under nitrogen atmosphere to achieve final zeolite composition of 20% w/v. The suspension of zeolite in toluene was continuously stirred until homogeneous suspension was obtained. Then, phenyltriethoxysilane of 1 millimole/1 gram of zeolite and triethylamine with ratio of triethylamine: phenyltriethoxysilane of 1:1 by mole were added under nitrogen atmosphere. The mixture was heated to 120 degree Celsius and held at this temperature for 8 hours. The obtained suspended particles was filtered and rinsed with solvent prior to dry under vacuum at 100 degree Celsius for 24 hours.

Masterbatch was prepared by mixing the phenyl modified zeolite with the copolymer using internal mixer at 200 degree Celsius for 10 minutes. The final composition of modified zeolite was 30% of total weight. The mixture was crushed into small pellets. Only the pellets that cannot filtered through 2×2 millimeter sieve were used in further steps.

EXAMPLE 2

Preparation methods of plastic film from the masterbatch containing phenyl modified zeolite beta (Si/Al=300 and particle size ($D_{50}$)=0.62 micrometers) and styrene-b-(ethylene-ran-butylene)-b-styrene copolymers with styrene content of 13% from EXAMPLE 1 is as follows: mix the masterbatch with plastic resin of low density polyethylene (LDPE) with solid density of 0.92 gram/cubic centimeters (ASTM D1505) and melt flow index of 5.5 grams/10 minutes (condition: 190/2.16, ASTM D1238), and additives, i.e., anti-blocking agent, in an amount of 0.2% of total weight by mechanical mixing. The masterbatch:plastic resin ratio is 33:67, thus composition of phenyl modified zeolite beta is 10% of total weight. The dry mixed compound was then fabricated by blown film extrusion process using single screw extruder with set temperature of 160-190 degree Celsius and speed of 50 rpm. The film obtained had a thickness of 30±5 micrometers. Moreover, the film had an acceptable mechanical property, quite clear and easy to open.

Ethylene, oxygen and carbon dioxide transmission rates of the film are shown in Table 1. The results of the film containing unmodified zeolite beta and alkyl modified zeolite beta are also shown in the table as a comparison.

TABLE 1

Ethylene, oxygen and carbon dioxide transmission rates, and ethylene selectivity of the films containing zeolite beta

| Type of film | Thickness (micrometers) | Gas Transmission Rate (cubic centimeters/square meters · day) | | | Ethylene Selectivity** |
| --- | --- | --- | --- | --- | --- |
| | | Ethylene* | Oxygen* | Carbon dioxide* | |
| [Beta-SiPh/SEBS]/LDPE | 33.3 ± 2 | 73,980 ± 123 | 10,998 ± 131 | 38,686 ± 405 | 7.5 |
| [Beta-SiC$_8$H$_{17}$***/SEBS]/LDPE (for comparison) | 31.2 ± 1 | 69,443 ± 189 | 11,998 ± 217 | 43,423 ± 283 | 5.8 |
| [Beta/SEBS]/LDPE (for comparison) | 33.4 ± 3 | 68,117 ± 193 | 12,498 ± 114 | 35,626 ± 328 | 5.5 |

Remarks:
Beta is zeolite beta
Beta-SiR is zeolite beta modified by silylation reaction where R is Ph (phenyl group) and C$_8$H$_{17}$ (octyl group)
SEBS is styrene-b-(ethylene-ran-butylene)-b-styrene copolymers with styrene content of 13%
LDPE is low density polyethylene
*Gas transmission rate obtained from the continuous flow measurement where gas transports from 100% gas to 100% nitrogen on the other side of the film
**Ethylene selectivity is ethylene permeability to oxygen permeability
***Organosilane containing alkyl chain commonly used to modify aluminosilicates was selected for a comparison Plastic film containing phenyl modified zeolite beta according to this invention has both ethylene transmission rate and ethylene selectivity higher than those of the film containing unmodified zeolite and the film containing octyl modified zeolite.

The invention claimed is:

1. A masterbatch for preparing plastic film with high ethylene permselectivity comprising:
   (A) styrene-b-(ethylene-ran-butylene)-b-styrene copolymers with styrene to ethylene-ran-butylene content of 12:88 to 14:86; and
   (B) zeolites of which surface is modified by silylation reaction with organosilane compound and which is presented in an amount of 30% to 70% by weight of said copolymer combined with zeolite, wherein said organosilane compound having the chemical formula:

in which
R is methoxy, ethoxy or chloro group,
$R^1$ is methyl group,
$R^2$ is functional group capable of forming π-π interaction selected from the group consisting of phenyl, phenylethyl, vinyl, and propyl methacrylate groups, and n is 0 and 2.

2. The masterbatch for preparing plastic film with high ethylene permselectivity according to claim 1, wherein said zeolite is selected from the group consisting of zeolite beta, ZSM-5, silicalite, and CaA.

3. The masterbatch for preparing plastic film with high ethylene permselectivity according to claim 2, said zeolite having ethylene adsorption capacity (at 100% ethylene) of 60 milliliters/1 gram zeolite.

4. The masterbatch for preparing plastic film with high ethylene permselectivity according to claim 2, said zeolite having average particle size ($D_{50}$) of 0.25 to 10 micrometers.

5. A plastic film with high ethylene permselectivity comprising:
   polymer which is selected from the group consisting of polyolefins and polystyrene; and masterbatch presented in an amount of 3.5% to 90% by weight of total contents, wherein said masterbatch comprising:
- (A) styrene-b-(ethylene-ran-butylene)-b-styrene copolymers with styrene to ethylene-ran-butylene content of 12:88 to 14:86; and
- (B) zeolites of which surface is modified by silylation reaction with organosilane compound and which is presented in an amount of 30% to 70% by weight of the copolymer combined with the zeolite, wherein said organosilane compound having the chemical formula:

$$R^1{}_n SiR^2 R_{3-n}$$

in which

R is methoxy, ethoxy or chloro group, $R^1$ is methyl group, $R^2$ is functional group capable of forming π-π interaction selected from the group consisting of phenyl, phenylethyl, vinyl, and propyl methacrylate groups, and n is 0 and 2.

6. The plastic film with high ethylene permselectivity according to claim 5, further comprising additives in an amount of 0.02% to 5% by weight of total contents.

7. The plastic film with high ethylene permselectivity according to claim 6, wherein said additives is selected from the group of anti-blocking agent and anti-fogging agent.

8. The plastic film with high ethylene permselectivity according to claim 5, wherein said polyolefins is selected from the group consisting of polyethylene and polypropylene.

* * * * *